(12) United States Patent
Gillilan

(10) Patent No.: US 11,819,792 B2
(45) Date of Patent: Nov. 21, 2023

(54) BIDIRECTIONAL AIRFLOW FILTER

(71) Applicant: Columbus Industries, Inc., Ashville, OH (US)

(72) Inventor: Chrystal Gillilan, London, OH (US)

(73) Assignee: Columbus Industries, Inc., Ashville, OH (US)

( * ) Notice: Subject to any disclaimer, the term of this patent is extended or adjusted under 35 U.S.C. 154(b) by 0 days.

(21) Appl. No.: 14/940,914

(22) Filed: Nov. 13, 2015

(65) Prior Publication Data

US 2016/0136560 A1 May 19, 2016

Related U.S. Application Data

(60) Provisional application No. 62/079,870, filed on Nov. 14, 2014.

(51) Int. Cl.
  *B01D 46/12* (2022.01)
  *B01D 46/10* (2006.01)

(52) U.S. Cl.
  CPC ............. *B01D 46/12* (2013.01); *B01D 46/10* (2013.01); *B01D 2275/10* (2013.01)

(58) Field of Classification Search
  CPC ..... B01D 46/10; B01D 46/12; B01D 2275/10
  USPC ........................................................ 55/486
  See application file for complete search history.

(56) References Cited

U.S. PATENT DOCUMENTS

| | | | |
|---|---|---|---|
| 2,612,966 A | 10/1952 | Nicol | |
| 3,155,560 A | 11/1964 | Frohmader et al. | |
| 3,216,578 A | 11/1965 | Wright et al. | |
| 3,727,769 A | 4/1973 | Scholl | |
| 3,793,692 A | 2/1974 | Tate et al. | |
| 4,093,437 A | 6/1978 | Ichihara et al. | |
| 4,115,082 A | 9/1978 | Newell | |
| 4,323,374 A | 4/1982 | Shinagawa et al. | |
| 4,758,460 A | 7/1988 | Spicer et al. | |
| 4,902,306 A | 2/1990 | Burnett et al. | |
| 4,904,288 A | 2/1990 | d'Augereau | |
| 4,978,372 A | 12/1990 | Pick | |
| 4,980,069 A * | 12/1990 | Gauger | B01D 67/0088 210/490 |
| 5,037,455 A | 8/1991 | Scheineson et al. | |

(Continued)

FOREIGN PATENT DOCUMENTS

JP  2003240328 A  *  8/2003  ............. F24F 13/28

OTHER PUBLICATIONS

"Equivalent" The American Heritage Dictionary of the English Language, Fourth Edition copyright 2000 by Houghton Mifflin Company. Updated in 2009. Published by Houghton Mifflin Company. https://web.archive.org/web/20130423110400/https://www.thefreedictionary.com/equivalent (Year: 2009).*

*Primary Examiner* — Hayden Brewster
(74) *Attorney, Agent, or Firm* — Jason H. Foster; Kremblas & Foster

(57) ABSTRACT

A filtration media that may be mounted in a frame and placed in a central heating, cooling and/or ventilation system. The media has symmetrical characteristics such that, when mounted in the frame, the resulting filter may be mounted with either one major surface of the filtration media receiving the air flow or the opposite major surface receiving the air flow. Regardless of how the filter is oriented, the performance of the filter is the same due to the symmetrical characteristics of the filtration media mounted therein.

7 Claims, 4 Drawing Sheets

(56) References Cited

U.S. PATENT DOCUMENTS

| | | |
|---|---|---|
| 5,342,423 A | 8/1994 | Taft |
| 5,419,953 A | 5/1995 | Chapman |
| 5,437,701 A | 8/1995 | Townsley |
| 5,620,545 A | 4/1997 | Braun et al. |
| 5,910,277 A | 6/1999 | Ishino et al. |
| 5,947,815 A | 9/1999 | Danforth |
| 5,989,303 A | 11/1999 | Hodge |
| 6,059,852 A | 5/2000 | Olson |
| 6,156,089 A | 12/2000 | Stemmer et al. |
| 6,171,684 B1 * | 1/2001 | Kahlbaugh ............ B01D 27/06 428/212 |
| 6,228,152 B1 | 5/2001 | Guerin et al. |
| 6,274,041 B1 | 8/2001 | Williamson et al. |
| 6,336,948 B1 | 1/2002 | Inoue et al. |
| 6,514,325 B2 | 2/2003 | Cox et al. |
| 6,878,177 B2 | 4/2005 | Lohr et al. |
| 6,926,750 B2 | 8/2005 | Tanaka et al. |
| 6,986,804 B2 | 1/2006 | Dominiak et al. |
| 7,097,694 B1 | 8/2006 | Jaroszczyk et al. |
| 7,311,751 B2 | 12/2007 | Mei et al. |
| 7,556,663 B2 | 7/2009 | Niakan |
| 7,691,186 B2 | 4/2010 | Wiser |
| 7,754,041 B2 | 7/2010 | Fox et al. |
| 7,776,123 B2 | 8/2010 | Lawrence |
| 7,811,350 B2 | 10/2010 | Hirata et al. |
| 7,951,229 B2 | 5/2011 | Ptak et al. |
| 8,105,425 B2 | 1/2012 | Ptak et al. |
| 8,343,251 B2 | 1/2013 | Ptak et al. |
| 8,491,690 B2 | 7/2013 | Crabtree et al. |
| 8,815,041 B2 | 8/2014 | Underwood et al. |
| 8,834,611 B1 | 9/2014 | Dimicelli |
| 8,945,267 B2 | 2/2015 | Anoszko et al. |
| 2004/0060858 A1 | 4/2004 | Lucas et al. |
| 2004/0074387 A1 | 4/2004 | Jaisinghani |
| 2004/0118770 A1 * | 6/2004 | Sale ..................... B01D 69/12 210/488 |
| 2004/0125699 A1 * | 7/2004 | Miller ................. G01S 7/52006 367/99 |
| 2007/0227359 A1 | 10/2007 | Choi |
| 2008/0061009 A1 | 3/2008 | Muse et al. |
| 2008/0148946 A1 | 6/2008 | Lotgerink-Bruinenberg |
| 2009/0139405 A1 | 6/2009 | Schwarz et al. |
| 2009/0249957 A1 | 10/2009 | Lackey, Sr. |
| 2009/0255404 A1 * | 10/2009 | Ptak .................. B01D 46/0032 96/11 |
| 2010/0043639 A1 | 2/2010 | Fox et al. |
| 2010/0000411 A1 | 7/2010 | Wertz et al. |
| 2011/0259813 A1 * | 10/2011 | Wertz ................. B01D 39/1615 264/510 |
| 2013/0205732 A1 | 8/2013 | Gillilan |
| 2015/0082757 A1 * | 3/2015 | Chaen .................. B32B 27/322 55/482 |
| 2017/0173509 A1 * | 6/2017 | Giglia ................. B01D 39/1623 |

* cited by examiner

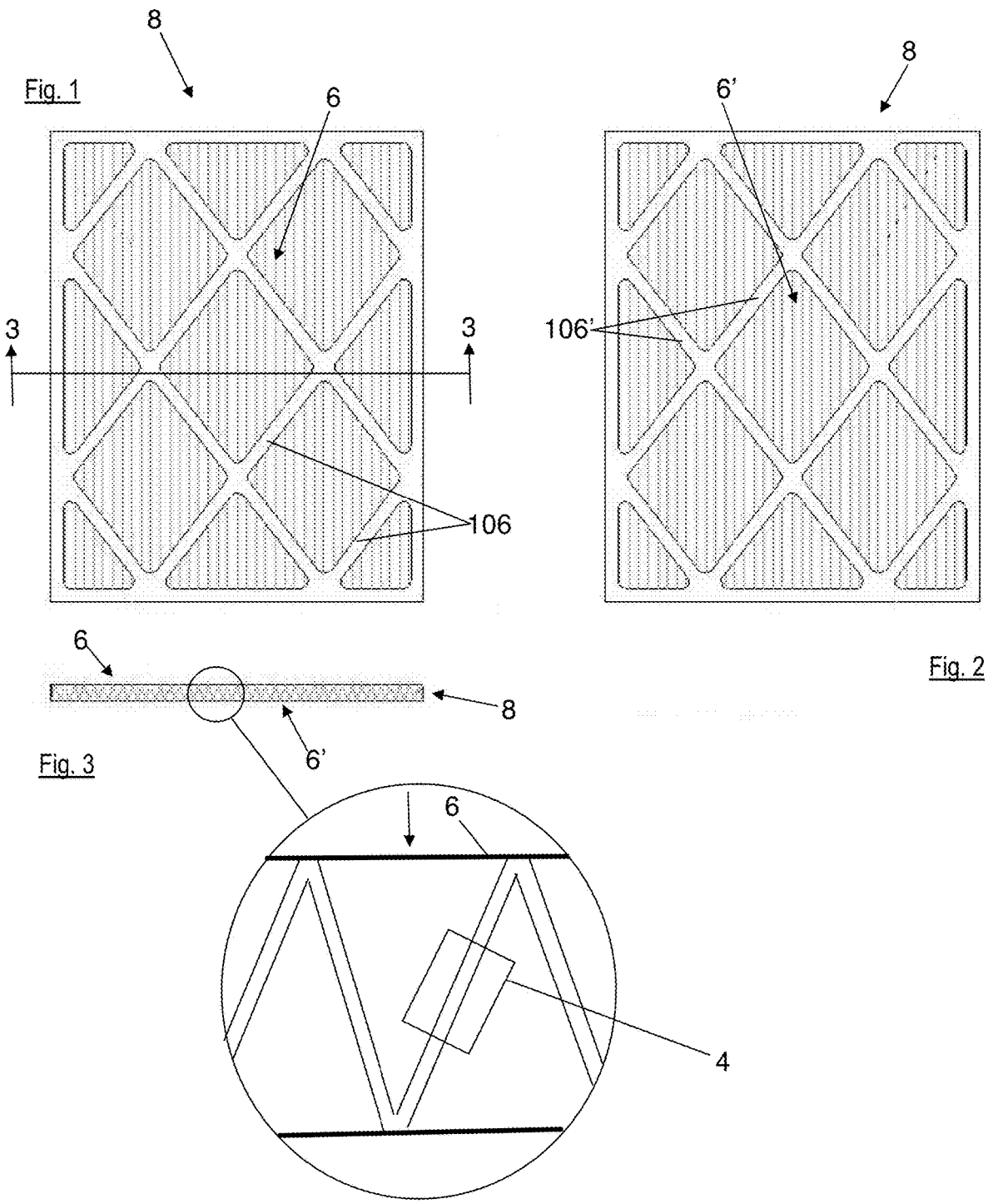

| | Pressure Drop (mm $H_2O$) | Penetration (%) |
|---|---|---|
| Sample 1 | 2.12 | 0.137 |
| Sample 2 | 2.21 | 0.120 |
| Sample 3 | 2.22 | 0.132 |

BIDIRECTIONAL AIRFLOW FILTER

CROSS-REFERENCES TO RELATED APPLICATIONS

This application claims the benefit of U.S. Provisional Application No. 62/079,870 filed Nov. 14, 2014. This prior application is hereby incorporated by reference.

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

The invention relates generally to air filtration devices, and more particularly to a generally planar air filter that can operate with equal results regardless of whether it is placed in an air stream in one direction or the opposite direction.

In the residential heating, ventilation and air conditioning (HVAC) market, there are many disposable pleated air filters on the market. Most such filters are made of non-woven filtration material laminated to a non-filtering support layer, the combination of which is then pleated and adhered to a paperboard frame at the edges. The filter is typically formed into a planar configuration with a thickness that is substantially less than the width and length of the filter. Such filters are normally placed in an air stream, typically the ducting between the furnace and the air returns in a house or other building, so that air impacts the generally planar filter in a path that is substantially perpendicularly to the plane of the overall filter.

The configuration of conventional air filters results in the air flow direction through conventional filters significantly affecting their performance. Performance of a filter can be measured by dust holding capacity, pressure drop, loading and other parameters, and because of the way conventional filters are constructed, some or all of these factors can be different depending upon whether the air perpendicularly impacts one major surface of the planar filter or the opposite major surface. Conventional filters, therefore, have a correct and an incorrect orientation relative to the equipment into which they are installed. This requires an indicator of the correct airflow direction on the frame or elsewhere to ensure correct placement of the filter in the filter housing by the installer of the filter.

In the case of residential HVAC filters, most filters are installed by homeowners who, due to inexperience and lack of training, are not familiar with the necessity of orientation. If the installer places the filter in the filter housing in the incorrect orientation, one or more of the following conditions can result: poor airflow, higher pressure drop, lower efficiency, and/or lower filter life. Such unidirectional prior art filters cannot be loaded equally from both sides when in pleated form in particular.

One reason for the unidirectional nature of conventional HVAC filters is that many such filters have all of the support for the media only on the downstream side of the media. Such support can include a grid mounted in the frame, expanded metal, or finger-shaped pleat supports. If these typically constructed filters are installed backward relative to airflow, the result is reduced structural integrity, lower filter life, and possibly decreased efficiency.

Another reason for the unidirectionality of conventional air filters is the asymmetrical construction of the filtration media, which is a result of how the media is manufactured. Filtration materials commonly have a side that is referred to as a "screen side" or a "belt side", which is the side of the filtration media layer that rests against the screen, belt or other substrate upon which the media is formed. As media is formed on a substrate, such as a screen, one side of the media contacts the screen first and the remaining media is built up above that belt side until the media reaches the desired thickness at the side opposite the screen side. Because of how the material is thus built up, the density of the belt side tends to be greater than the density of the opposite side, due to the force of gravity compressing the belt side material more due to the weight of the material against the belt. This results in a gradient in density through the thickness of the media, which is referred to herein as "thickness asymmetry" and similar terms.

A filtration medium with thickness asymmetry in a filter performs better when air passes through the medium in one direction than in the opposite direction. This can be due to "loading", which is a term used to describe the process by which particles in the air stream are lodged throughout the thickness of the filter medium. Typically, the larger particles are removed at the upstream side of the filter media and the smaller particles are progressively strained out as the air carrying the particles carries the particles downstream through the media.

Most filtration media has a gradient density variation that causes the density to increase along the media's thickness when progressing from the entry side to the exit (typically the belt) side. For proper particulate loading, air should enter the filter at the more open, less dense side, and the less open, more dense side is oriented toward the side of the filter where air exits. This is to allow the filter to load evenly throughout the thickness based on particulate size so that smaller particles penetrate the media and only become lodged where they can no longer pass through the media. If larger particles are removed first, and smaller particles pass farther through the media, as is preferred, the filter loads progressively throughout the filter's thickness, which maximizes filter efficiency. The alternative, which is not preferred, is to have the higher density, less open material at the entry surface, and this surface loads with large and small particles, and thereby clogs the filter's pores more rapidly. This rapid clogging at the entry surface causes more small particles (and anything larger than the smaller pores) to be strained out at the upstream side of the media, leaving many unused pores in the inside of the filter media that are available for holding particles. Such a phenomenon decreases the filter's life and pressure drop increases more rapidly as the openings at the entry surface are filled with large and small particles, rather than throughout the filter's thickness where alternative paths exist.

BRIEF SUMMARY OF THE INVENTION

Disclosed herein is a filter having at least first and second layers of sheet filter material, wherein the denser "belt side"

of the first layer of sheet filter material may be laminated to the denser belt side of the second layer of sheet filter material along a central plane of the media or the sides opposite the belt sides may be laminated together. A support layer that does not filter small particles may be interposed between the first and second layers. Many such support layers may be laminated in the media. As a result of the construction, the density and other filtration characteristics at any distance on a first side of the central plane are the same as at the density and other filtration characteristics at the the same distance from the central plane on an opposite, second side of the central plane. The filtration media may be pleated and disposed in a conventional frame, and placed in an air stream in either of two orientations with no difference in performance due to the precise symmetry of the filtration media about the central plane.

The lamination of the filtration layers, the pleating and the insertion within, and adhesion to, the frame are conventional unless described otherwise. Thus, the filtration layers can be laminated using adhesive sprayed or otherwise disposed across the major surface of one layer, and the other layer is brought into contact. Alternatively, the filtration layers can be ultrasonically welded, stitched or otherwise attached together and/or to the support layer. At every distance from a central plane on a first side of the central plane, the filter has substantially equivalent filtration characteristics as the filter has at the same distance from the central plane on a second, opposite side of the central plane. This results in a filter that can be placed in an air stream in either of two, opposite directions with the same performance characteristics resulting.

The support layer has a central axis that corresponds to a Central Plane. A first filter sheet may be laminated in a conventional manner with the belt side against a support layer. A second filter sheet may be laminated in a conventional manner to the belt side against the opposite surface of the support layer. The combined filter sheets and support layer may then be pleated, preferably in a conventional manner. The pleated or other configuration of layer combinations may be installed in a frame, which frame may have symmetrical characteristics.

The filter described herein has a combination of structural features that eliminates the unidirectionality inherent in conventional filtration media, and thereby avoids problems associated with an installer installing the filter in an improper orientation. The filter has the same performance regardless of which side air enters first, and thus it is inconsequential how the installer installs the filter. This eliminates the problem of installation error that can reduce efficiency greatly and even damage HVAC equipment.

Test results have shown that an embodiment of the invention using two filtration media layers with two support layers that are only laminated between the filtration layers has a pressure drop that is almost 4% lower, and a higher dust-holding capacity, than a conventional arrangement of the same filtration media. The conventional arrangement used a support layer between and on the downstream side of the filtration layers. Another embodiment of the invention that was tested has support layers laminated on the upstream and downstream sides of both filtration layers, which are laminated together. This embodiment has a similar pressure drop to that of the prior art, but has higher efficiency.

The difference between the first embodiment of the invention and the prior art configuration using the same filtration and support layers is believed to be due to compression of the upstream filtration layer against the support layer(s) in the invention when exposed to air flow, whereas the downstream filtration layer of the invention does not compress because there is no support layer downstream of the downstream filtration layer. However, in the prior art and the embodiment of the invention with support layers on the outside, both filtration layers are supported by one or more downstream support layers, and thus both filtration layers compress against support layers under air flow. This compression of both filtration layers appears to increase the pressure drop of the media over that of media made according to the invention. However, in the embodiment of the invention with support only on the outside, the pressure drop was the same as the prior art but the efficiency was noticeably greater.

BRIEF DESCRIPTION OF THE SEVERAL VIEWS OF THE DRAWINGS

FIG. 1 is a schematic front view illustrating an embodiment of the present invention.

FIG. 2 is a schematic rear view illustrating the embodiment of FIG. 1.

FIG. 3 is a schematic end view in section through the line 3-3 of FIG. 1, with a magnified portion.

Figure 4:
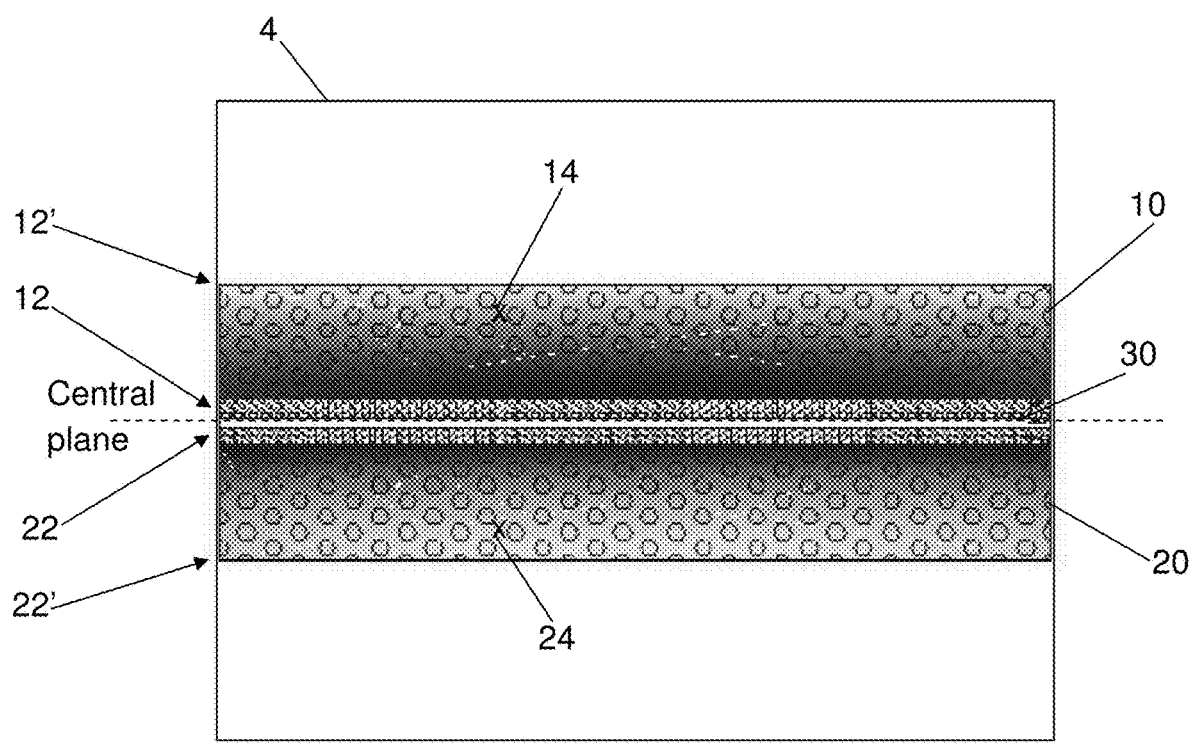
FIG. 4 is a schematic end view in section of a magnified portion of the illustration of FIG. 3.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Provisional Patent Application Ser. No. 62/079,870 is incorporated in this application by reference.

A filter 8 is shown in FIGS. 1-3 having first and second major faces 6 and 6' that air or another gas stream may impinge upon during normal use, as shown by the arrow in the magnified portion of FIG. 3. This may occur by placing the filter 8 across a duct or other gas path, and the gas stream may impinge at an approximately perpendicular angle to the major face 6. As shown in FIG. 4, which is a further magnified view of that portion of the filter 8 that is within the rectangle 4 in FIG. 3, the filtration media is made up of first and second layers 10 and 20 with a support layer 30 laminated therebetween. The layers 10 and 20, as with any filter media layer described herein, may be made of any type of conventional nonwoven fiber filtration media, including, without limitation, filter media made from spunbonded, meltblown, electrospun, needled, hydro-entangled, or wet-laid processes. The filtration media layers 10 and 20, as with any media layer described herein, may be made of any conventional fibers, such as synthetic or natural fibers, including, without limitation, polypropylene, glass, modacrylic, polyester, cotton, cellulose-based, and others. The size range of the fibers may extend from as little as 1 to 3 nanometers up to about 100 micrometers. Such media layers have a "belt side" that is more dense and may have smaller openings than an opposite major side of the media layer.

The support layer 30 may be any material that enhances the rigidity and/or the ability of the combination of the filtration media and the support layer to be pleated. Support materials described herein may include, but are not limited to, punched, expanded, extruded, or molded mesh materials, expanded metal or plastic, plastic nettings, and extruded grid works. Paper, such as die-cut paperboard, may be used, for example for flat panel filters, in addition to rigid roll goods such as fiberglass and polyesters with air permeability greater than about 600 cubic feet per minute (cfm). The support layer 30 has large enough openings that it has no measurable filtration effect on small particles.

As shown in FIGS. 1-3, the filtration media described herein may be mounted inside of a frame. The frame is preferably paperboard, but could be plastic or metal, and may have optional support members 106 and 106' extending across both major surfaces 6 and 6' of the filter 8. The optional support members 106 and 106' may be adhered to the filtration media, and where the filtration media is pleated the support members 106 and 106' may be adhered to the tops of the pleated media.

The filter media layer 10 has a belt side 12 that is the surface of the layer 10 that seats against the screen, belt or other conventional structure upon which the non-woven layer 10 is formed during manufacture and an opposite side 12'. The layer 20 has a belt side 22 that is the surface of the layer 20 that seats against the screen, belt or other conventional structure upon which the non-woven layer 20 is formed during manufacture and an opposite side 22'. The belt side 12 or the opposite side 12' may be laminated in a conventional manner to one major surface of the support layer 30. The belt side 22 or the opposite side 22' may be laminated to the opposite major surface of the support layer 30 in a conventional manner, which may be by applying adhesive on the facing surfaces and then placing them in contact with one another. Pressure may be applied in a conventional manner by extending the layers 10, 20 and 30 through a gap formed between biased rollers. The layers 10, 20 and 30 may be welded, stitched or otherwise laminated so that substantially all fibers on a plane that defines the belt side 12 are in contact with one side of the support layer 30, and substantially all fibers on a plane that defines the belt side 22 are in contact with the opposite side of the support layer 30. The belt sides 12 and 22 of the layers 10 and 20 may be laminated to the support layer 30 across the entire span from one edge of each layer to the opposite edge.

An imaginary division may be drawn through the support layer 30, and is referred to herein as the Central Plane because it is at the center of the media. The Central Plane marks a position about which the filter media has substantially symmetrical characteristics. That is, if one were to measure any characteristic of the filter 8, prior to loading of the filter 8 with particles, at a given position 14 from the Central Plane on one side of the Central Plane, the characteristic on the opposite side of the Central Plane at that same distance from the Central Plane, such as at the position 24, would be substantially the same. Thus, if the media layers 10 and 20 are each about 1 millimeter thick, one can measure a characteristic (such as density of the media) 0.5 millimeter on one side of the Central Plane and that characteristic will be the same at 0.5 millimeter on the opposite side of the Central Plane, assuming the distance from the Central Plane is taken along a line perpendicular to the Central Plane at the same position along the Central Plane. The same phenomenon would exist at 0.2 millimeters, and at one nanometer, on opposite sides of any point on the Central Plane.

Figure 5:
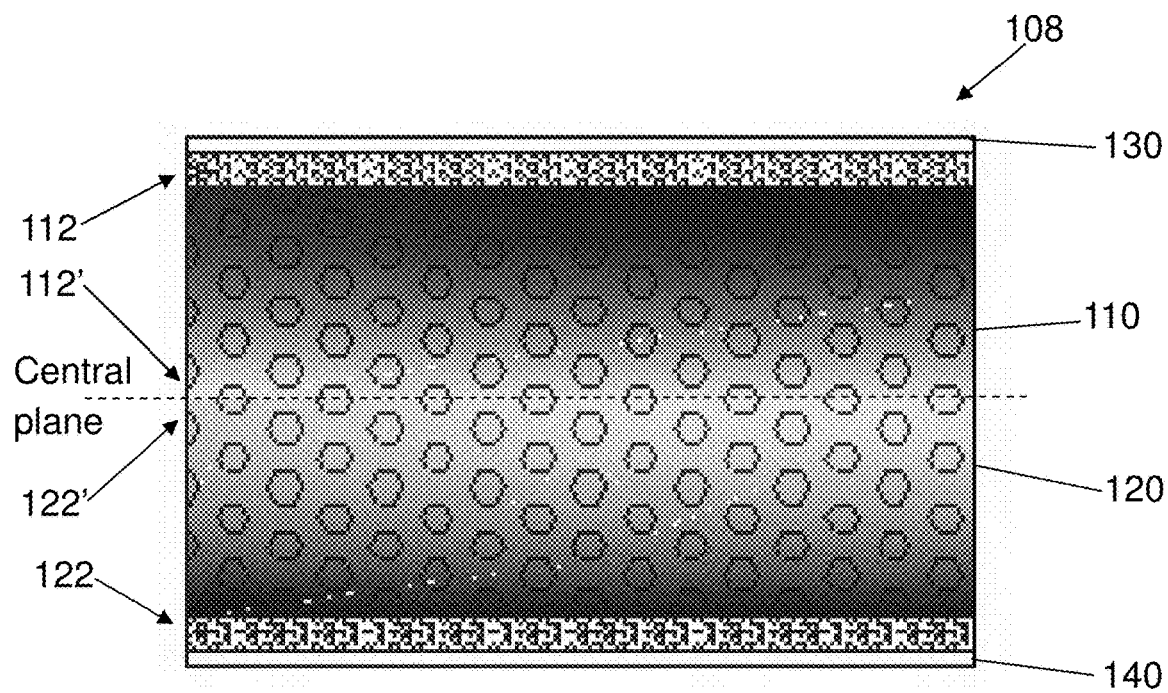
FIG. 5 is a schematic end view in section of a magnified portion of an alternative embodiment of the invention.

In an alternative embodiment shown in FIG. 5, a filter media 108 has a first layer 110 of filtration media laminated to a second layer 120 of filtration media and these layers 110 and 120 are combined with support layers 130 and 140 laminated on belt sides 112 and 122. The support layers 130 and 140 may be omitted if the filtration layers 110 and 120 are sufficiently rigid. With all contemplated embodiments, any parameter that has a gradient, such as density, within a first layer changes with position toward the center of the media's thickness at the Central Plane, and then changes back with position toward the opposite side of the Central Plane in the second layer. There is substantially the same, relatively higher density at the outer, belt sides 112 and 122 of the media, with the density increasing (and/or other filtration characteristics similarly changing) with progression toward the Central Plane of the filter's thickness at the opposite sides 112' and 122' of the layers 110 and 120. Of course, if for some reason surface loading is desired, the media 108 may be manufactured with the opposite configuration of that shown in FIG. 5.

As another alternative, the invention contemplates two or more layers of filtration media that have a uniform density (i.e., with no density gradient) throughout the thickness. This can arise due to manufacturing methods that include non-gravity or anti-gravitational steps, or other ways of arresting the increase in density on one side. Such filtration media layers are mounted together, with or without one or more support layers, to construct a filter that is non-directional.

The filters of all embodiments are constructed so that on each side of the Central Plane of the filter the media construction, support layers, and framing design is a "mirror image" of the opposite side of the Central Plane. This provides a symmetrical filter with substantially the same characteristics on opposite sides of the Central Plane through the thickness of filter. Thus, the filter construction is the same on the downstream side of the Central Plane as it is on the upstream side. This allows for the same performance when the filter is oriented with the airflow direction through the filter in one direction as when the filter is oriented in the reverse orientation with the airflow in the opposite direction. Such a filter makes it possible to eliminate any air flow direction indicators that are necessary for conventional unidirectional filters, and eliminates the risk of the filter being improperly installed by the consumer due to the fact that there is no improper installation orientation.

Figure 6:
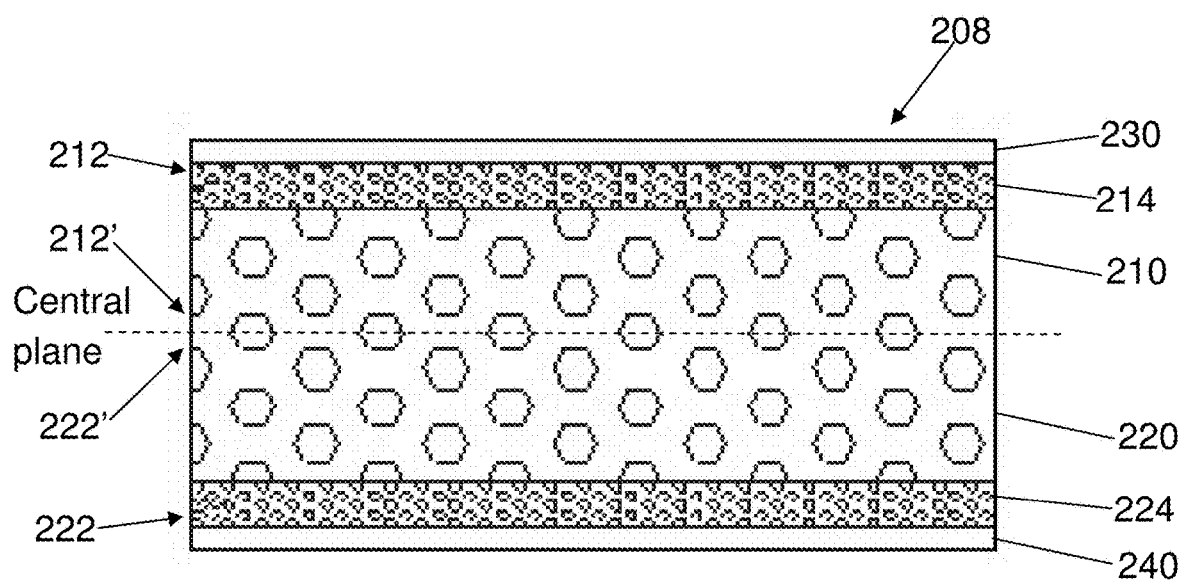
FIG. 6 is a schematic end view in section of a magnified portion of another alternative embodiment of the invention.

As shown in FIG. 6, another alternative filtration media 208 has a first filter layer 210 with the belt side 212 facing away from an opposite side 212' that is laminated in a conventional manner to a second filter layer 220. The second layer's 220 belt side 222 faces away from the opposite side 222' of the layer 220. The plane of lamination is the Central Plane. A first support layer 230 is mounted to the outer surface of the first layer 210 in a conventional manner, and a second support layer 240 is mounted to the outer surface of the second layer 220 in a conventional manner. The combined filter sheet layers 210 and 220 and the support layers 230 and 240 may be pleated. The pleated or other configuration of the combination of layers that make up the filter media 208 is then installed in a frame that may have symmetrical characteristics. Thus, at any distance on one side of the Central Plane, the density and other filtration characteristics are the same as at that same distance on the opposite side of the Central Plane.

The media 208 of FIG. 6 shows carrier layers, which may be referred to as "scrims" or a backer material, functioning as support layers 230 and 240 and mounted to one face of each of the filtration media layers in a conventional manner. As is known in the filtration technology, some filtration media is built on a scrim or backer because the fibers are delicate or need to be connected to each other by mechanical means, such as needling. As an example, meltblown polypropylene fibers are commonly manufactured on a carrier layer (often referred to as a "backer") because such polypropylene fibers are delicate. Fibers that are needled to a backer material layer are usually needled into a scrim to hold the web of media together. Thus, the embodiment of FIG. 6 shows that the orientation of the carrier layer makes a substantial difference in performance, analogous to the orientation of the belt side.

As shown in FIG. 6, a first filter layer 210 is laminated in a conventional manner, with the first filter layer's 210 belt side 212 disposed away from a second filter layer 220. The second filter layer 220 has a belt side 222 that faces away from the first filter layer 210. The plane of lamination between the filter layer 210 and the filter layer 220 defines the Central Plane. A first carrier layer 214 attaches to the outer surface of the first filter sheet 210 and a second carrier layer 224 attaches to the outer surface of the second filter sheet 220, all of which are conventional unless noted otherwise. A first support layer 230 is mounted to the outer surface of the first carrier layer 214 and a second support layer 240 is mounted to the outer surface of the second carrier layer 224, with both support layers 230 and 240 being mounted in a conventional manner. The combined filter sheets, carrier layers and support layers can then be pleated. The pleated or other configuration combination of layers is then installed in a frame that may have symmetrical characteristics. Thus, at any distance on one side of a position on the Central Plane, the density and other filtration characteristics are the same as at that same distance on the opposite side of the Central Plane at that same position.

Thus, it can be seen that the filters described above have substantially the same filtration characteristics on both sides of a Central Plane drawn through the thickness of the filter. It is also contemplated that the Central Plane can be drawn through a fraction of the thickness of the filter that is at less than about half of the filter's thickness. In this contemplated alternative, the characteristics of the filter are substantially the same on both sides of the Central Plane, but the characteristics are modified to be encountered in unequal thicknesses of the filter. Thus, a filter that is one inch thick can have density in a one-quarter of an inch thick top layer that is equal to the density of the lower three-quarters of an inch. In this case, the Central Plane is "drawn" through a plane one-quarter of an inch from the top surface.

Figures 7, 8:
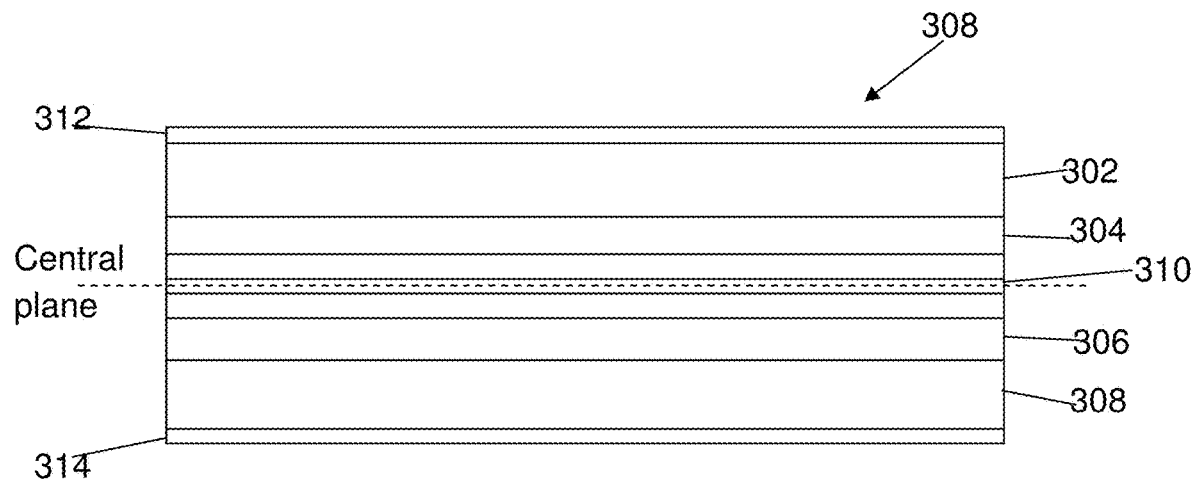
FIG. 7 is a schematic end view in section of a magnified portion of another alternative embodiment of the invention having a plurality of filtration and support layers.
FIG. 8 is a table containing data from testing of embodiments of the present invention and a prior art embodiment.

It is contemplated to have multiple filtration layers, such as in the embodiment of FIG. 7, in which the filter layers 302 and 304 are laminated together and the layers 306 and 308 are laminated together. It is also contemplated to have multiple support layers, such as the support layer 310 lying along the Central Plane in FIG. 7 and laminated to the filtration layers 304 and 306. Similarly, the support layers 312 and 314 are laminated to the filtration layers 302 and 308, respectively.

As described above, the direction of airflow can strike the first major surface of the filter according to the invention, or it can strike the opposite major surface. In some embodiments, the filtration layers are uniform or gradient density material with higher density close to the support layer than far from the support layer. In other embodiments, the gradient density is oppositely configured. Some support layers may be optional, depending upon the strength of the filtration layer.

In FIG. 8, results are shown from testing of three samples of filtration media. Sample 1 has a configuration according to the invention in which four layers are laminated together with the configuration of, from the upstream to the downstream side, filtration layer-support layer-support layer-filtration layer. Sample 2 has a configuration according to the invention in which four layers are laminated together with the configuration of, from the upstream to the downstream side, support layer-filtration layer-filtration layer-support layer. Sample 3 has a configuration according to the prior art in which four layers are laminated together with the configuration of, from the upstream to the downstream side, filtration layer-support layer-filtration layer-support layer. Substantially identical filtration layer and support layer materials were used in all three samples.

The results for Sample 1 show that the pressure drop of this embodiment of the invention was almost 4% lower than for the Sample 3 prior art. At the same time, the dust-holding capacity, which increases with increased penetration, was also higher than the prior art. Similarly advantageous results were found with Sample 2, in which the pressure drop was similar to the prior art, but the penetration was substantially lower, resulting in an increase in efficiency over the prior art. With the Sample 1 embodiment of the invention, one can obtain an improvement over the prior art in pressure drop and dust-holding capacity, or with the Sample 2 embodiment of the invention, one can equal the pressure drop of the prior art while obtaining greater efficiency. Thus, one can select an embodiment of the invention that is appropriate for a given set of circumstances. This selection results in a surprising improvement over the prior art resulting from a different arrangement of the same filtration and support layers.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A gas-permeable filtration media comprising:
   (a) a first nonwoven fiber filtration layer having a belt side that contacted a substrate when the first filtration layer was formed, an opposite second side, and a first density gradient that is a variation in density through a thickness of the first filtration layer from the second side to the first side; and
   (b) a second nonwoven fiber filtration layer having a belt side that contacted a substrate when the first filtration layer was formed, an opposite second side, and a second density gradient that is a variation in density through a thickness of the second filtration layer from the second side to the first side, the second side of the second filtration layer laminated to the second side of the first filtration layer along a central plane;
wherein the belt side of the first filtration layer and the belt side of the second filtration layer have higher density than the second sides of the first and second filtration layers and are spaced equal distances from the central plane, and wherein the first density gradient is the same as the second density gradient.

2. The gas-permeable filtration media in accordance with claim 1, wherein the central plane is located at substantially half the thickness of the gas-permeable filtration media.

3. The gas-permeable filtration media in accordance with claim 1, further comprising a first gas-permeable, substantially non-filtering support layer mounted to the first filtration layer and a second gas-permeable, substantially non-filtering support layer mounted to the second filtration layer, wherein the first and second gas-permeable, substantially non-filtering support layers are spaced from one another.

4. The gas-permeable filtration media in accordance with claim 3, wherein the first side of the first filtration layer is laminated to the first gas-permeable, substantially non-filtering support layer and the first side of the second filtration layer is laminated to the second gas-permeable, substantially non-filtering support layer.

5. A filtration media comprising:
(a) a first nonwoven fiber filtration layer having a first side, an opposite second side, and a first density gradient that is a variation in density through a thickness of the first filtration layer from the second side to the first side;
(b) a second nonwoven fiber filtration layer having a first side, an opposite second side, and a second density gradient that is a variation in density through a thickness of the second filtration layer from the second side to the first side; and
(c) a first gas-permeable, substantially non-filtering support layer interposed and laminated between the first and second filtration layers, the second side of the first filtration layer and the second side of the second filtration layer disposed adjacent the first gas-permeable, substantially non-filtering support layer, wherein the first side of the first filtration layer and the first side of the second filtration layer are spaced equal distances from a central plane, and wherein the first density gradient is the same as the second density gradient.

6. The filtration media in accordance with claim 5, wherein the central plane is located at substantially half of a thickness of the filtration media.

7. The filtration media in accordance with claim 5, further comprising a second gas-permeable, substantially non-filtering support layer interposed between the first and second filtration layers.

* * * * *